United States Patent
Liu et al.

(10) Patent No.: US 9,921,647 B1
(45) Date of Patent: Mar. 20, 2018

(54) PREVENTIVE EYE CARE FOR MOBILE DEVICE USERS

(71) Applicant: INTERNATIONAL BUSINESS MACHINES CORPORATION, Armonk, NY (US)

(72) Inventors: Su Liu, Austin, TX (US); Shunguo Yan, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 15/267,168

(22) Filed: Sep. 16, 2016

(51) Int. Cl.
G06F 3/01 (2006.01)
G09G 5/00 (2006.01)
G06F 3/00 (2006.01)

(52) U.S. Cl.
CPC .............. *G06F 3/013* (2013.01); *G06F 3/005* (2013.01); *G09G 5/003* (2013.01); *G09G 2330/027* (2013.01); *G09G 2354/00* (2013.01); *G09G 2360/144* (2013.01)

(58) Field of Classification Search
CPC ......... G06F 3/013; G06F 3/005; G09G 5/003; G09G 2354/00; G09G 2330/027; G09G 2360/144
See application file for complete search history.

(56) References Cited

U.S. PATENT DOCUMENTS

| | | | |
|---|---|---|---|
| 6,483,485 B1 * | 11/2002 | Huang | G06F 3/011 345/10 |
| 7,234,814 B2 | 6/2007 | Morita et al. | |
| 7,701,434 B2 | 4/2010 | Kreek et al. | |
| 7,741,957 B2 | 6/2010 | Wang et al. | |
| 8,550,820 B2 | 10/2013 | Soltanoff | |
| 8,810,413 B2 | 8/2014 | Wong et al. | |
| 8,847,885 B2 | 9/2014 | Huang | |
| 8,888,288 B2 | 11/2014 | Iravani et al. | |

(Continued)

FOREIGN PATENT DOCUMENTS

| CN | 2510940 Y | 9/2002 |
|---|---|---|
| WO | 2015156762 A1 | 10/2015 |

OTHER PUBLICATIONS

Caramba App Development, "EasyMeasure—Measure with your Camera!," iTunes Preview, Last Updated Sep. 2, 2016, p. 1-2, https://itunes.apple.com/us/app/easymeasure-measure-your-camera!/id349530105?mt=8, Accessed on Sep. 7, 2016.

(Continued)

*Primary Examiner* — Kevin M Nguyen
(74) *Attorney, Agent, or Firm* — Robert C. Bunker

(57) ABSTRACT

A method for preventing vision damage to a user viewing a screen of a mobile device is presented. The method may include collecting viewing condition data. The method may also include retrieving an eye health profile associated with the user. The method may then include retrieving eye health guidelines. The method may further include determining a maximum reading time based on the collected viewing condition data, the retrieved eye health profile, and the retrieved eye health guidelines. The method may also include determining that the determined maximum reading time exceeds a current reading time. The method may then include performing a preventive action in response to determining that the determined maximum reading time exceeds the current reading time.

20 Claims, 5 Drawing Sheets

(56) References Cited

U.S. PATENT DOCUMENTS

| | | | |
|---|---|---|---|
| 2003/0156254 A1* | 8/2003 | Turovetsky | A61H 5/00 351/203 |
| 2007/0171364 A1 | 7/2007 | Beresford | |
| 2009/0116735 A1* | 5/2009 | Tsai | G06F 3/013 382/159 |
| 2009/0160655 A1* | 6/2009 | Chen | G06F 3/013 340/573.1 |
| 2012/0092172 A1* | 4/2012 | Wong | G06F 3/011 340/575 |
| 2012/0327123 A1 | 12/2012 | Felt | |
| 2013/0013331 A1 | 1/2013 | Horseman | |
| 2014/0160019 A1 | 6/2014 | Anda et al. | |
| 2014/0285436 A1 | 9/2014 | Wu | |
| 2015/0116207 A1 | 4/2015 | Chen | |

OTHER PUBLICATIONS

Leroy et al., "Visual Fatigue Reduction for Immersive Stereoscopic Displays by Disparity, Content, and Focus-Point Adapted Blur," IEEE Transactions on Industrial Electronics, Oct. 2012, p. 3998-4004, vol. 59, No. 10.

Mell et al., "The NIST Definition of Cloud Computing," National Institute of Standards and Technology, Sep. 2011, p. 1-3, Special Publication 800-145.

\* cited by examiner

PREVENTIVE EYE CARE FOR MOBILE DEVICE USERS

BACKGROUND

The present invention relates generally to the field of computing, and more particularly to device display control.

Eye strain and discomfort is becoming a widespread problem as more people spend increasing amounts of time looking at mobile device screens. Prolonged use of digital devices may eventually lead to temporary or permanent eye damage.

SUMMARY

According to one exemplary embodiment, a method for preventing vision damage to a user viewing a screen of a mobile device is provided. The method may include collecting viewing condition data. The method may also include retrieving an eye health profile associated with the user. The method may then include retrieving eye health guidelines. The method may further include determining a maximum reading time based on the collected viewing condition data, the retrieved eye health profile, and the retrieved eye health guidelines. The method may also include determining that the determined maximum reading time exceeds a current reading time. The method may then include performing a preventive action in response to determining that the determined maximum reading time exceeds the current reading time.

According to another exemplary embodiment, a computer system for preventing vision damage to a user viewing a screen of a mobile device is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include collecting viewing condition data. The method may also include retrieving an eye health profile associated with the user. The method may then include retrieving eye health guidelines. The method may further include determining a maximum reading time based on the collected viewing condition data, the retrieved eye health profile, and the retrieved eye health guidelines. The method may also include determining that the determined maximum reading time exceeds a current reading time. The method may then include performing a preventive action in response to determining that the determined maximum reading time exceeds the current reading time.

According to yet another exemplary embodiment, a computer program product for preventing vision damage to a user viewing a screen of a mobile device is provided. The computer program product may include one or more computer-readable storage devices and program instructions stored on at least one of the one or more tangible storage devices, the program instructions executable by a processor. The computer program product may include program instructions to collect viewing condition data. The computer program product may also include program instructions to retrieve an eye health profile associated with the user. The computer program product may then include program instructions to retrieve eye health guidelines. The computer program product may further include program instructions to determine a maximum reading time based on the collected viewing condition data, the retrieved eye health profile, and the retrieved eye health guidelines. The computer program product may also include program instructions to determine that the determined maximum reading time exceeds a current reading time. The computer program product may then include program instructions to perform a preventive action in response to determining that the determined maximum reading time exceeds the current reading time.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
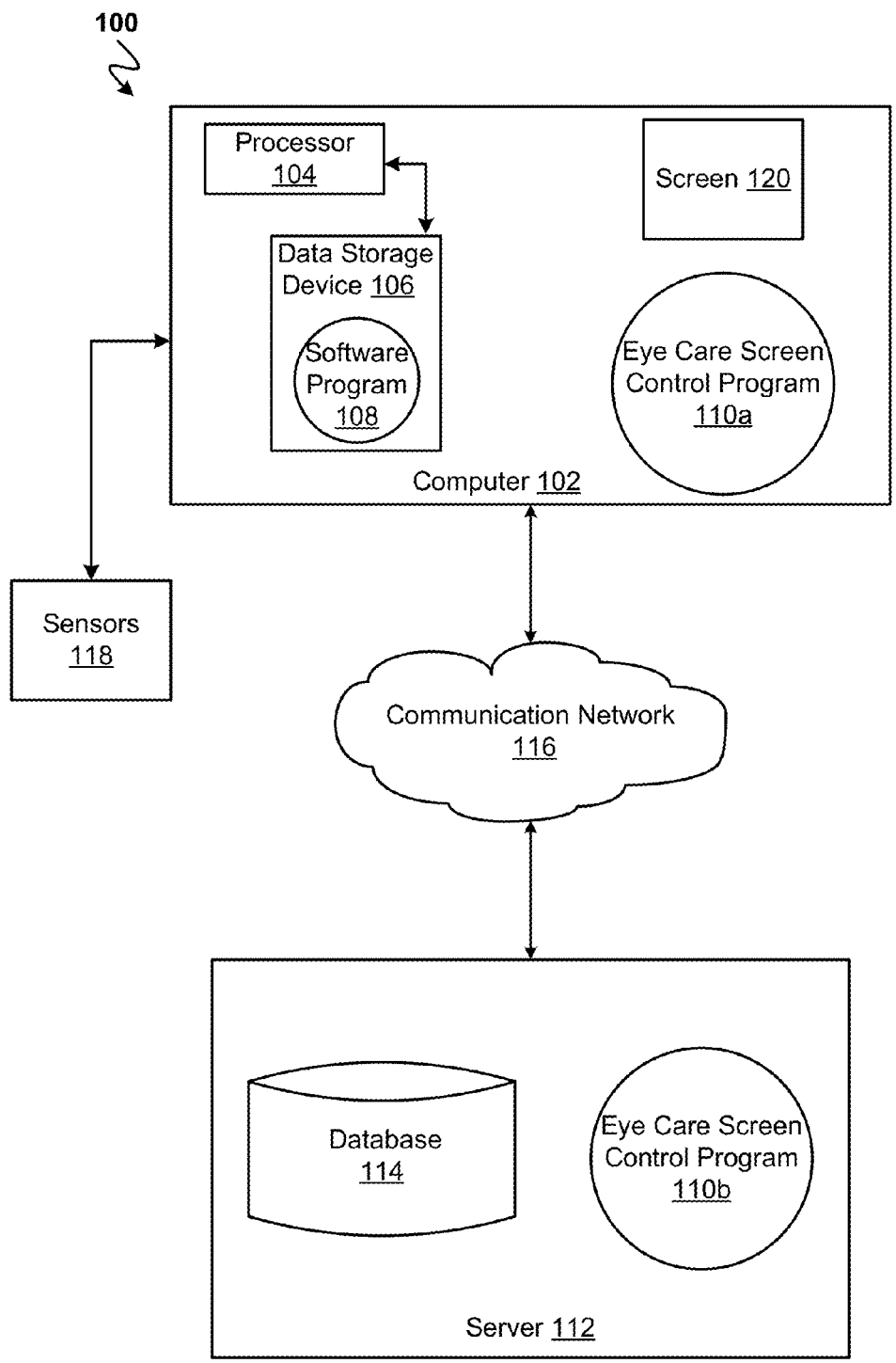
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for eye health oriented screen control. As such, the present embodiment has the capacity to improve the technical field of device screen control by monitoring factors that may lead to eye damage from viewing a device screen and take action when a user's eyes may be at risk. More specifically, sensors on an electronic device may monitor factors such as the amount of time the user is looking at the device screen, if the user is moving, the amount of ambient light, and the brightness of the display. Data collected regarding the aforementioned factors may be used in conjunction with a user's eye health profile and predefined rules or physician recommendations to determine if the user is at a point when the user's eyes may be in danger if the user continues to look at the device screen. Based on determining that the user's eyes may be at risk, preventive action may be taken, such as turning off the device screen.

As described previously, eye strain and discomfort is becoming a widespread problem as more people spend increasing amounts of time looking at mobile device screens. Prolonged use of digital devices may eventually lead to temporary or permanent eye damage. Traditionally, in an indoor desktop environment, users have been advised to adopt safe practices such as proper head positioning and a preferred distance from the user's eyes to a computer screen to maintain proper eye care. However, in the current mobile device era, users, especially teens and young adults, read from mobile devices in varying conditions, such as while travelling in a car or walking, in changing lighting conditions, and while sitting or lying down. These varying screen viewing conditions may not be as controlled as in a desktop environment, thus the user's eyes may strain to account for viewing conditions that are not ideal and that may be changing. Additionally, user's eyes may strain due physiological factors such as the user's age and existing eye health problems. As such, it may be advantageous to, among other things, provide a way to determine when a user's eyes may be at risk for damage based on determined real-time viewing conditions, user physiology, and predetermined health rules and then take preventive action.

According to at least one embodiment, a mobile device's built-in cameras, Global Positioning System (GPS) receivers, accelerometer, light sensors and other sensors may be used to compile data that may then be correlated with the user's eye health profile to determine a proper amount of time that a user may read the mobile device under the current ambient viewing conditions without eye damage. The user's health profile may include physiological and historical data, such as the user's age, eye prescription, eye surgeries, eye diseases or abnormalities including sensitivity to light and blurred or double vision. If the proper amount of time (i.e., time threshold) determined previously has been exceeded, an appropriate response may occur. The appropriate response may be predetermined or user-defined and may include responses such as turning the device screen off or displaying a warning dialog box on the screen to notify the user to stop looking at the screen. The rules for determining the proper length of time under certain ambient viewing conditions may be predefined based on medical research, established eye care practices, or the recommendation of one or more physicians. Thus, the amount of time the user can view a device screen is determined dynamically based on ambient viewing conditions, the user's physiology, and medical guidance.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and an eye care screen control program 110a. Additionally, the computer 102 may also include one or more sensors 118 for collecting ambient viewing conditions and a screen 120. The sensors 118 may include a light sensor, an accelerometer, and a camera sensor. The sensors 118 may be used to collect ambient viewing conditions that a user is subjected to when viewing the screen 120 of the computer 102 (e.g., mobile device), such as determining if the device is moving via an accelerometer, determining the amount of ambient light via a light sensor, and determining if the user is looking at the screen via a front-facing camera sensor. The sensors 118 may be located within the computer 102 or external to, and accessible by, the computer 102. The networked computer environment 100 may also include a server 112 that is enabled to run an eye care screen control program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the eye care screen control program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the eye care screen control program 110a, 110b (respectively) to measure ambient viewing conditions and proactively turn off a device screen or otherwise take action to prevent eye strain or damage to a user based on the measured ambient viewing conditions, a health profile of the user, and eye health guidelines. The eye care screen control method is explained in more detail below with respect to FIG. 2.

Figure 2:
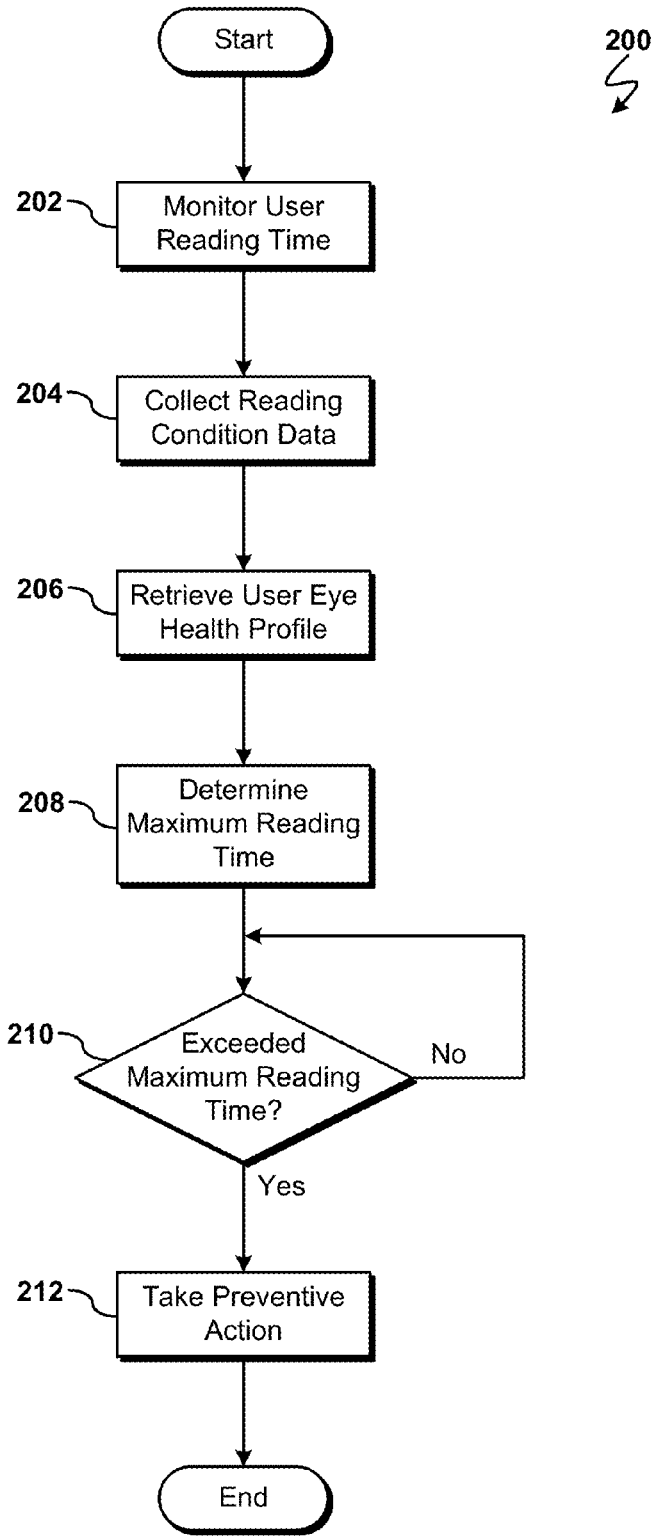
FIG. 2 is an operational flowchart illustrating a process for eye health oriented screen control according to at least one embodiment.

Referring now to FIG. 2, an operational flowchart illustrating the exemplary eye care screen control process 200 used by the eye care screen control program 110a and 110b according to at least one embodiment is depicted.

At 202, the reading time of the user is monitored. The user's reading time may be monitored using a variety of methods. The reading time may be determined based on the amount of time the screen 120 is on. Alternatively, the reading time may be determined based on a font-facing camera on the user's mobile device (i.e., computer 102) to determine how much time the user is looking at the screen using known methods. Reading time may also be determined by user interaction with the user's mobile device (e.g., user interaction to flip pages when viewing an eBook). The reading time may be recorded (e.g., in a database 114) and updated in real-time. Furthermore, reading time may accrue using known algorithms to record average reading time whereby the reading time may not be reset to zero if the screen is, for instance, turned off for only a few seconds and then turned back on. Thus the reading time may be reduced, however, the reading time may begin to accumulate again despite a brief interruption if the user continues to have the screen on.

Next, at 204, reading condition data is collected. Using the sensors 118 of the user's mobile device, the ambient reading (or viewing) conditions may be collected. Any available sensors 118 that may provide relevant information may be accessed to provide data indicating the current reading conditions the user is experiencing. For example, an accelerometer may be accessed to determine if the user is moving, and at what rate the user is moving as a user movement value (e.g., in miles per hour). Additionally, a light sensor may be used to determine the current ambient lighting conditions with an ambient lighting value (e.g., in lux). Other data may be collected, such as the current backlight brightness as a screen brightness value (e.g., as an integer on a scale of 1 to 100), the contrast ratio of the screen 120 as a screen contrast value (e.g., as an integer on a scale of 1 to 100), and a user position value indicating the user's position (standing up or lying down).

Then, at 206, a user eye health profile associated with the user may be retrieved. A user eye health profile may be stored remotely (or locally) in a data repository, such as a database 114. The eye health profile may then be accessed and retrieved by the eye care screen control program 110a and 110b from the data repository, for example, via the communications network 116, if the data repository is remote. The eye health profile may contain data about the user that describes factors contributing to the user's eye health. For example, the eye health profile may include data fields indicating the user's age, eye prescription, diseases that can impact eye health such as diabetes, light sensitivity, double vision or other vision problems, family health history that may predict future eye health problems, and so forth. The eye health profile may be created and maintained by physicians or the eye health profile may be created and populated by the user.

At 208, a maximum reading time is determined. The maximum reading time may be determined based on the ambient reading conditions collected previously at 204, the data retrieved from the user's eye health profile at 206, and predefined rules for eye health based on research, accepted best practices, or physician recommendations. The predefined eye health rules may be known guidelines found in digital form in databases 114, web sites, medical journals, physician recommendations, eye care practices, eye health research, or elsewhere, and retrieved. For example, the data the in the table below may indicate a maximum reading time based on the ambient light intensity and the motion or position of the user.

|  |  | Light Intensity (lux) | | |
| --- | --- | --- | --- | --- |
|  |  | Direct Sun (>2000) | Indoor Light (300-2000) | Dark (<300) |
| Motion | Moving in Car | 10 mins | 15 mins | 10 mins |
|  | Walking | 5 mins | 10 mins | 5 mins |
|  | Sitting | 15 mins | 25 mins | 10 mins |
|  | Lying Down | 5 mins | 15 mins | 5 mins |

Thus, if the accelerometer sensor of the user's mobile device indicates that user is moving at a rate of speed faster than a typical person can run, or faster than a person with the user's age and other health characteristics, then the user may be considered to be moving in car or other vehicle. Additionally, based on the ambient light intensity measured by a light sensor on the user's mobile device being 2500 lux, the maximum reading time may be determined to be 10 minutes based on the predefined guideline data shown in the above table.

Next, at 210, the eye care screen control program 110a and 110b determines if the maximum reading time has passed. The maximum reading time determined previously at 208 may be used as a threshold value and compared with the current reading time of the user. The current reading time may be determined as described previously at 202 and then compared with the maximum reading time. Continuing the previous example, if the maximum reading time was determined to be 10 minutes in current viewing conditions, and the current reading time is 11 minutes, then the eye care screen control program 110a and 110b will determine that the maximum reading time has passed (i.e., been exceeded). If the eye care screen control program 110a and 110b determines that the maximum reading time was not exceeded, the eye care screen control program 110a and 110b may continue to compare the current reading time with the maximum reading time at 210.

According to at least one embodiment, if a change in ambient conditions is detected, such as the user stops moving or the ambient light decreases, then the maximum reading time may be recalculated (as described previously at 208) based on collecting updated ambient condition data (as described previously at 204) from the sensors 118. The previously retrieved user eye health profile (as described previously at 206) and any predefined eye health rules (as described previously at 208) may be reused when recalculating the maximum reading time.

However, if the eye care screen control program 110a and 110b determined that the maximum reading was exceeded at 210, then preventive action is taken at 212. The preventive action that may be taken in response to determining that the maximum reading time has been exceeded may vary depending on implementation. The action taken may include turning the screen 120 off to prevent the user from viewing the screen 120 beyond the maximum reading time. Other actions may be taken, such as displaying a warning dialog box on the screen 120 to alert the user that potential eye damage may occur with continued reading. The dialog box may be implemented to cover over any other software program 108 running on the user's mobile device and require user interaction (e.g., pressing an onscreen button) to dismiss. According to at least one implementation, the dialog box may present the user with the option to turn off the screen, dismiss the warning, change screen brightness or contrast, or a combination of options.

It may be appreciated that FIG. 2 provides only an illustration of one embodiment and does not imply any limitations with regard to how different embodiments may be implemented. Many modifications to the depicted embodiment(s) may be made based on design and implementation requirements.

Figure 3:
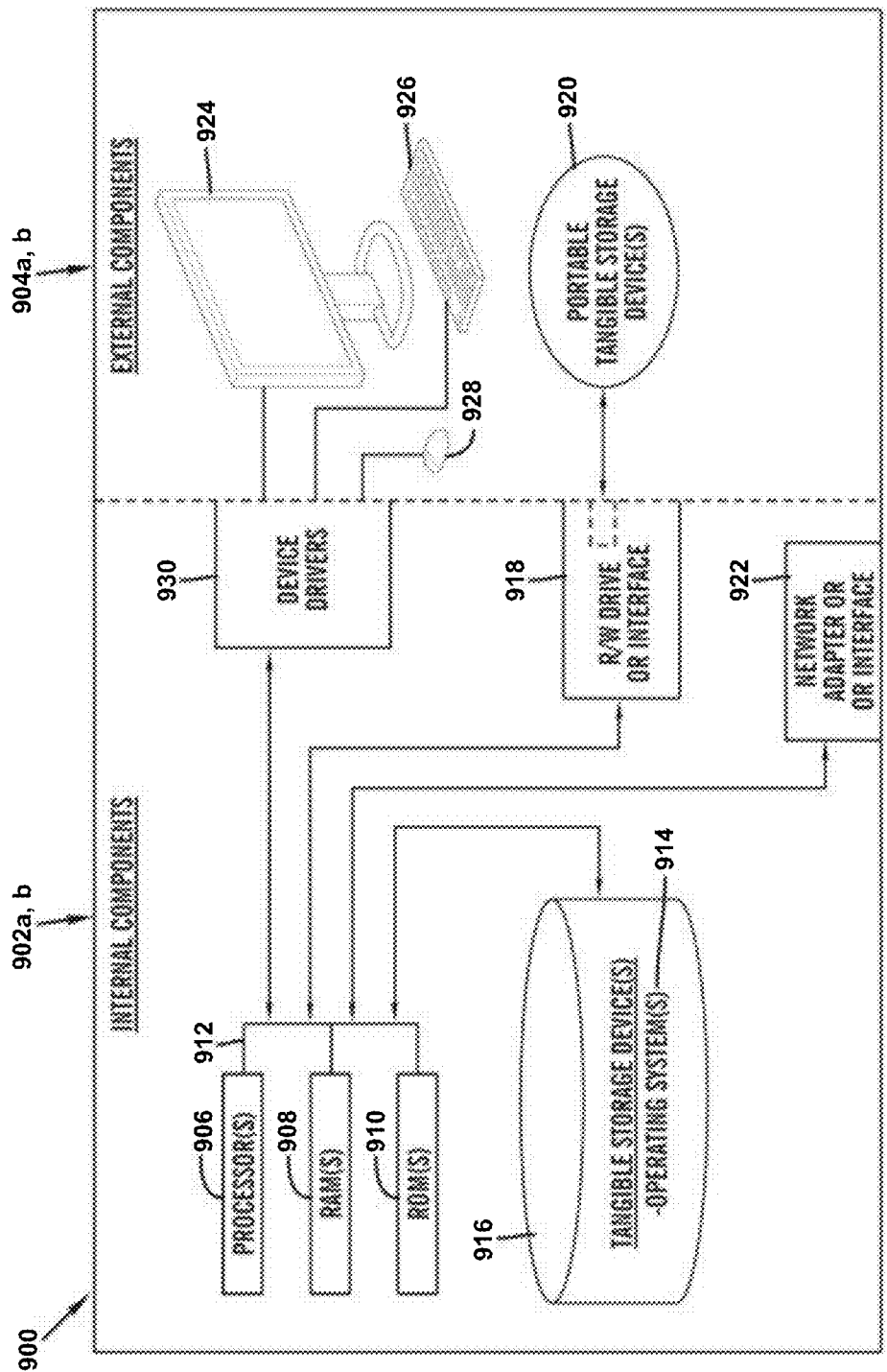
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908, and one or more computer-readable ROMs 910 on one or more buses 912, and one or more operating systems 914 and one or more computer-readable tangible storage devices 916. The one or more operating systems 914, the software program 108 and the eye care screen control program 110a in client computer 102, and the eye care screen control program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the eye care screen control program 110a and 110b can be stored on one or more of the respective portable computer-readable tangible storage devices 920, read via the respective R/W drive or interface 918, and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the eye care screen control program 110a in client computer 102 and the eye care screen control program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the eye care screen control program 110a in client computer 102 and the eye care screen control program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926, and computer mouse 928. The device drivers 930, R/W drive or interface 918, and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
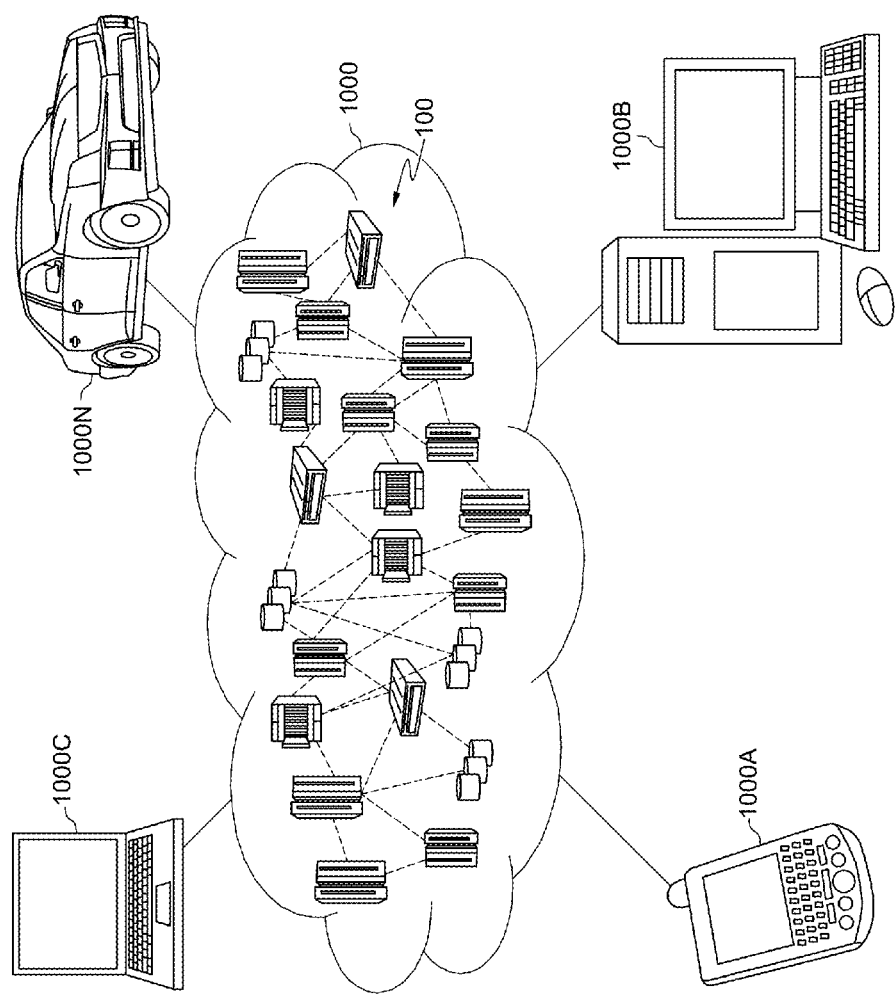
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
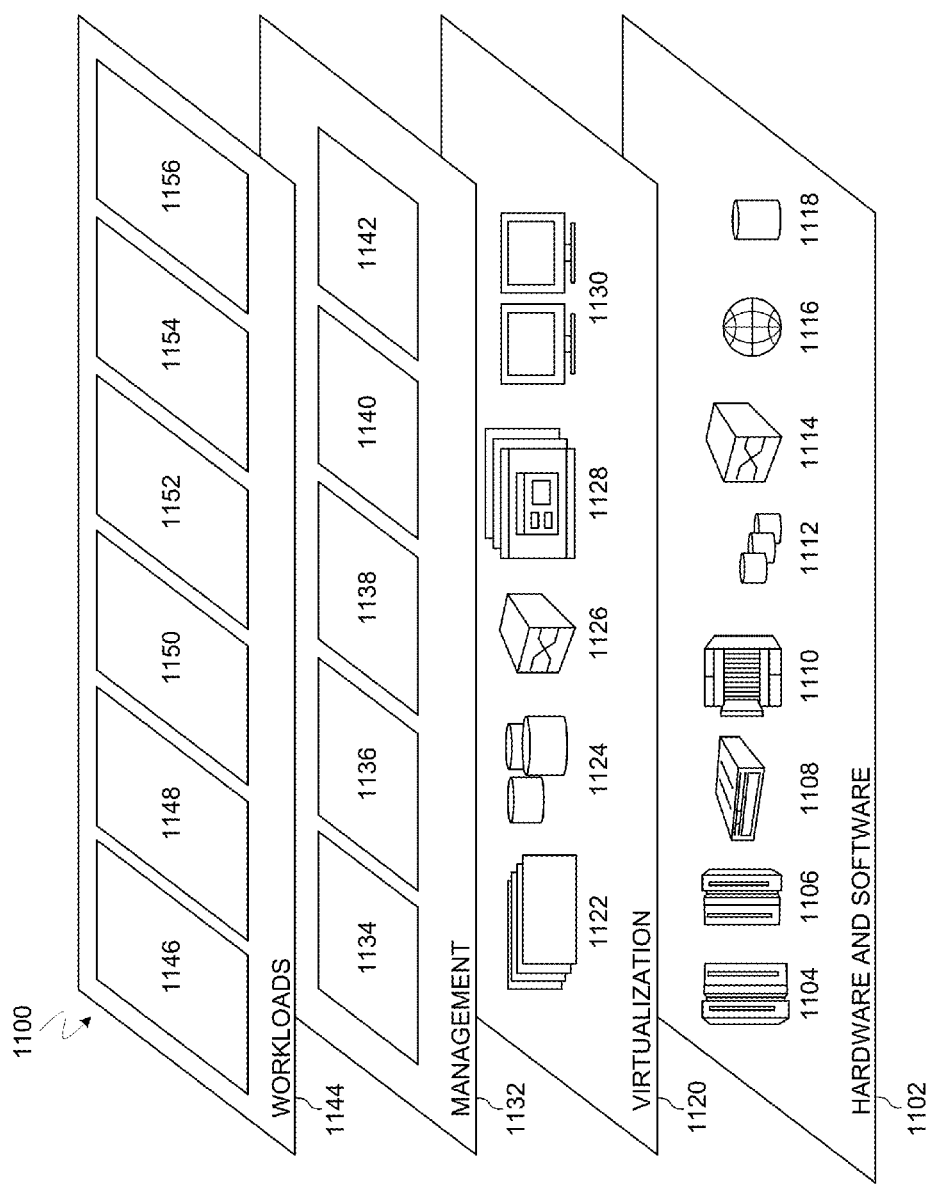
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and eye care screen control 1156. An eye care screen control program 110a, 110b provides a way to determine the maximum reading time for a user based on the ambient viewing conditions, the user's physiology, and medial guidelines.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for preventing vision damage to a user viewing a screen of a mobile device, the method comprising:
   collecting viewing condition data;
   retrieving an eye health profile associated with the user;
   retrieving eye health guidelines;
   determining a maximum reading time based on the collected viewing condition data, the retrieved eye health profile, and the retrieved eye health guidelines;

determining that the determined maximum reading time exceeds a current reading time; and performing a preventive action in response to determining that the determined maximum reading time exceeds the current reading time.

2. The method of claim 1, wherein viewing condition data is selected from the group consisting of an ambient lighting value, a user movement value, a user position value, a screen brightness value, and a screen contrast value.

3. The method of claim 1, wherein the eye health profile comprises a data structure containing a user age field, a user eye disease field, and a user vision problem data field.

4. The method of claim 1, wherein the preventive action is selected from the group consisting of turning the screen off and presenting a warning dialog box on the screen.

5. The method of claim 1, wherein the viewing condition data is collected by at least one sensor connectively coupled to the mobile device, and wherein the at least one sensor is selected from the group consisting of a light sensor, an accelerometer, and a front-facing camera sensor.

6. The method of claim 1, further comprising:
determining that viewing conditions have changed;
collecting new viewing condition data;
determining a new maximum reading time based on the collected new viewing condition data, the retrieved eye health profile, and the retrieved eye health guidelines;
determining that the determined new maximum reading time exceeds the current reading time; and
performing a preventive action in response to determining that the determined new maximum reading time exceeds the current reading time.

7. The method of claim 1, wherein the eye health guidelines are selected from the group consisting of at least one medical journal, eye care practices, eye health research, and a physician recommendation.

8. A computer system for preventing vision damage to a user viewing a screen of a mobile device, comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
collecting viewing condition data;
retrieving an eye health profile associated with the user;
retrieving eye health guidelines;
determining a maximum reading time based on the collected viewing condition data, the retrieved eye health profile, and the retrieved eye health guidelines;
determining that the determined maximum reading time exceeds a current reading time; and
performing a preventive action in response to determining that the determined maximum reading time exceeds the current reading time.

9. The computer system of claim 8, wherein viewing condition data is selected from the group consisting of an ambient lighting value, a user movement value, a user position value, a screen brightness value, and a screen contrast value.

10. The computer system of claim 8, wherein the eye health profile comprises a data structure containing a user age field, a user eye disease field, and a user vision problem data field.

11. The computer system of claim 8, wherein the preventive action is selected from the group consisting of turning the screen off and presenting a warning dialog box on the screen.

12. The computer system of claim 8, wherein the viewing condition data is collected by at least one sensor connectively coupled to the mobile device, and wherein the at least one sensor is selected from the group consisting of a light sensor, an accelerometer, and a front-facing camera sensor.

13. The computer system of claim 8, further comprising:
determining that viewing conditions have changed;
collecting new viewing condition data;
determining a new maximum reading time based on the collected new viewing condition data, the retrieved eye health profile, and the retrieved eye health guidelines;
determining that the determined new maximum reading time exceeds the current reading time; and
performing a preventive action in response to determining that the determined new maximum reading time exceeds the current reading time.

14. The computer system of claim 8, wherein the eye health guidelines are selected from the group consisting of at least one medical journal, eye care practices, eye health research, and a physician recommendation.

15. A computer program product for preventing vision damage to a user viewing a screen of a mobile device, comprising:
one or more computer-readable storage medium and program instructions stored on at least one of the one or more tangible storage medium, the program instructions executable by a processor, the program instructions comprising:
program instructions to collect viewing condition data;
program instructions to retrieve an eye health profile associated with the user;
program instructions to retrieve eye health guidelines;
program instructions to determine a maximum reading time based on the collected viewing condition data, the retrieved eye health profile, and the retrieved eye health guidelines;
program instructions to determine that the determined maximum reading time exceeds a current reading time; and
program instructions to perform a preventive action in response to determining that the determined maximum reading time exceeds the current reading time.

16. The computer program product of claim 15, wherein viewing condition data is selected from the group consisting of an ambient lighting value, a user movement value, a user position value, a screen brightness value, and a screen contrast value.

17. The computer program product of claim 15, wherein the eye health profile comprises a data structure containing a user age field, a user eye disease field, and a user vision problem data field.

18. The computer program product of claim 15, wherein the preventive action is selected from the group consisting of turning the screen off and presenting a warning dialog box on the screen.

19. The computer program product of claim 15, wherein the viewing condition data is collected by at least one sensor connectively coupled to the mobile device, and wherein the at least one sensor is selected from the group consisting of a light sensor, an accelerometer, and a front-facing camera sensor.

20. The computer program product of claim 15, further comprising:

program instructions to determine that viewing conditions have changed;

program instructions to collect new viewing condition data;

program instructions to determine a new maximum reading time based on the collected new viewing condition data, the retrieved eye health profile, and the retrieved eye health guidelines;

program instructions to determine that the determined new maximum reading time exceeds the current reading time; and program instructions to perform a preventive action in response to determining that the determined new maximum reading time exceeds the current reading time.

* * * * *